United States Patent
Hiraoka

(10) Patent No.: US 8,121,657 B2
(45) Date of Patent: Feb. 21, 2012

(54) PORTABLE ELECTRONIC DEVICE

(75) Inventor: Yoshiaki Hiraoka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 415 days.

(21) Appl. No.: 12/395,312

(22) Filed: Feb. 27, 2009

(65) Prior Publication Data

US 2010/0048262 A1 Feb. 25, 2010

(30) Foreign Application Priority Data

Feb. 27, 2008 (JP) ................................. 2008-045804

(51) Int. Cl.
*H04M 1/00* (2006.01)
(52) U.S. Cl. ................ 455/575.1; 455/575.3; 455/575.7
(58) Field of Classification Search .................... None
See application file for complete search history.

(56) References Cited

U.S. PATENT DOCUMENTS

| | | | | |
|---|---|---|---|---|
| 5,335,368 | A * | 8/1994 | Tamura | 455/575.7 |
| 6,985,760 | B2 * | 1/2006 | Hosonuma | 455/575.3 |
| 7,603,150 | B2 | 10/2009 | Takahashi | |
| 2006/0105820 | A1 * | 5/2006 | Takahashi | 455/575.1 |

FOREIGN PATENT DOCUMENTS

| | | |
|---|---|---|
| JP | 06112880 A | 4/1994 |
| JP | 08097617 A | 4/1996 |
| JP | 10084406 A | 3/1998 |
| JP | 2000-138522 | 5/2000 |
| JP | 2000165124 A | 6/2000 |
| JP | 2001345882 A | 12/2001 |
| JP | 2002368850 A | 12/2002 |
| JP | 2003037415 A | 2/2003 |
| JP | 2004015307 A | 1/2004 |
| JP | 2004056426 A | 2/2004 |
| JP | 2005151051 A | 6/2005 |
| JP | 2006229333 A | 8/2006 |

* cited by examiner

*Primary Examiner* — Anh Tran
(74) *Attorney, Agent, or Firm* — DLA Piper LLP (US)

(57) ABSTRACT

A portable electronic device is provided that reduces resonant frequency fluctuation of an antenna caused changes in the state of bodys thereof, thereby enabling the communication signal quality to be stabilized. A cellular telephone device 1 has an antenna 41 installed in an operation unit side body 2 thereof, and an electronic component 51 and an adjusting circuit 52, which is electrically connected to the electronic component 51 and adjusts the resonant frequency of the antenna 41, are installed in a display unit side body 3. A hinge portion 4 connects the operation unit side body 2 and the display unit side body 3 so as to freely change between a first state (closed state) in which the antenna 41 and electronic component 51 are capacitively coupled, and a second state (opened state) in which the antenna 41 and electronic component 51 are not capacitively coupled or capacitively coupled to a low degree.

20 Claims, 10 Drawing Sheets

PORTABLE ELECTRONIC DEVICE

This application is based on and claims the benefit of priority from Japanese Patent Application No. 2008-045804, filed on 27 Feb. 2008, the content of which is incorporated herein by reference.

BACKGROUND OF THE INVENTION

1. Field of the Invention

The present invention relates to an antenna-equipped portable electronic device that communicates with an external device.

2. Related Art

Flip type cellular (portable) telephones having a key-side body and a display-side body (composed, for example, of an LCD (liquid crystal display)) that can be folded together via a hinge mechanism have become mainstream devices. A main antenna for communication and conversation for this kind of cellular telephone device is disposed at an end portion of the key-side body or near a hinge mechanism that connects the key-side body and display-side body.

Here, if the main antenna 103 is built into an end portion of the key-side body (the end portion not linked by the hinge portion 104), the resonant frequency fc of the main antenna 103 will fluctuate when the key-side body 101 and display-side body 102 of the cellular telephone device 100 face each other (closed state) (see FIG. 14A) and when the key-side body 101 and display-side body 102 of the cellular telephone device 100 are exposed to the outside (opened state) (see FIG. 14B).

A reason for the fluctuation of resonant frequency fc of the main antenna 103 is that when the cellular telephone device 100 is in an opened state, the antenna is not adjacent to electronic components such as a microphone disposed in display-side body 102; however, when the cellular telephone device 100 is in a closed state, the main antenna 103 becomes adjacent to electronic components such as a microphone in the display-side body 102, so the C component (capacitive component) between the main antenna 103 and the electronic components fluctuates (increases).

Here, due to the resonant frequency fc being determined by Equation (3), when the C component fluctuates, the resonant frequency fc will also fluctuate.

$$fc = 1/2\pi\sqrt{(LC)} \quad (3)$$

In this way, if the resonant frequency fc fluctuates when the cellular telephone device 100 is open and closed, reception sensitivity will decrease. It should be noted that FIG. 15 shows a comparison of the return loss for the cellular telephone device 100 in the closed state and the return loss for the cellular telephone device 100 in the opened sate.

[Patent Publication 1] Japanese Unexamined Patent Application, First Publication No. 2000-138522

SUMMARY OF THE INVENTION

However, in recent years, cellular telephone devices have shown a strong trend to become more compact and thinner. As cellular telephone devices become thinner, the resonant frequency of the main antenna fluctuates dramatically from the opened state and the closed state of the cellular telephone device, making it difficult to stabilize the communication signal quality.

Here, to prevent fluctuation of the resonant frequency in the main antenna from the opened state and closed state of the cellular telephone device, a configuration has been conceived in which an adjusting circuit that adjusts resonant frequency in the main antenna is directly connected to the main antenna, as proposed in Patent Publication 1.

However, with such a configuration, it is necessary to connect the adjusting circuit directly to the main antenna, which leads to an inefficient layout of the components.

In the present invention, it is an object to provide a portable electronic device that solves the problem of an inefficient layout of components, decreases fluctuation of the antenna's resonant frequency caused by the changes in the states of the bodys, and can stabilize the communication signal quality.

To solve the aforementioned problems, the portable electronic device according to the present invention has a first body, an antenna disposed in the first body, a second body, an electronic component disposed in the second body, a connecting portion that connects the first body and the second body to be movable relatively, and an adjustment circuit that is electrically connected to the electronic component and adjusts a resonant frequency of the antenna according to the relative state of the first body and the second body moved by the connecting portion.

In addition, with the portable electronic device described above, the connecting portion connects to enable relative movement between a first state in which the antenna and electronic component are capacitively coupled, and a second state in which the degree of capacitance coupling is low for the antenna and the electronic component, or not capacitively coupled, and the adjusting circuit is preferred to adjust resonance frequency of the antenna according to the first state and the second state.

Moreover, it is preferred that the portable electronic device described above has a detection means for detecting the first state or the second state, and a switch that electrically connects the adjusting circuit and the electronic component when the first state is detected by the detecting means, and electrically disconnects the adjusting circuit and the electronic component when the second state is detected by the detecting means.

Furthermore, with the portable electronic device described above, it is preferred that the electronic component is disposed at a predetermined location inside the display-side body 1 so as to face the antenna in the first state.

In addition, with the portable electronic device described above, it is preferred that the antenna includes a metallic portion and that the metallic portion is formed to correspond to a shape or size of the electronic component.

Still further, with the portable electronic device described above, it is preferred for the electronic component to be configured to communicate predetermined information to outside of the second body using a sound output feature, a light emission feature, a display feature such as of character information, or other information communication features, and that the connecting portion relatively connects the first body and the second body to be movable so that the region where communication of predetermined information by the information communication means in the second body is covered by the first body in the first state.

According to the present invention, it is possible to provide a portable electronic device that solves the problem of an inefficient layout of components, decreases fluctuation of the antenna's resonant frequency caused by the states of the bodys, and can stabilize the communication signal quality.

DETAILED DESCRIPTION OF THE INVENTION

The best modes of the present invention will now be explained with reference to the drawings. It should be noted that, although the embodiment explained below is one in which electronic components of the present invention are applied to a portable electronic device, the present invention is not limited to a cellular telephone device, and can apply to portable electronic devices other than a cellular telephone, such as a portable game machine, a portable navigation device, a PDA (Personal Digital Assistant), a PC, and an EL display or LCD that is equipped with an operation unit.

The basic external structure of the cellular telephone device 1 according to a first embodiment will now be explained with reference to FIGS. 1 and 2.

Figure 1:
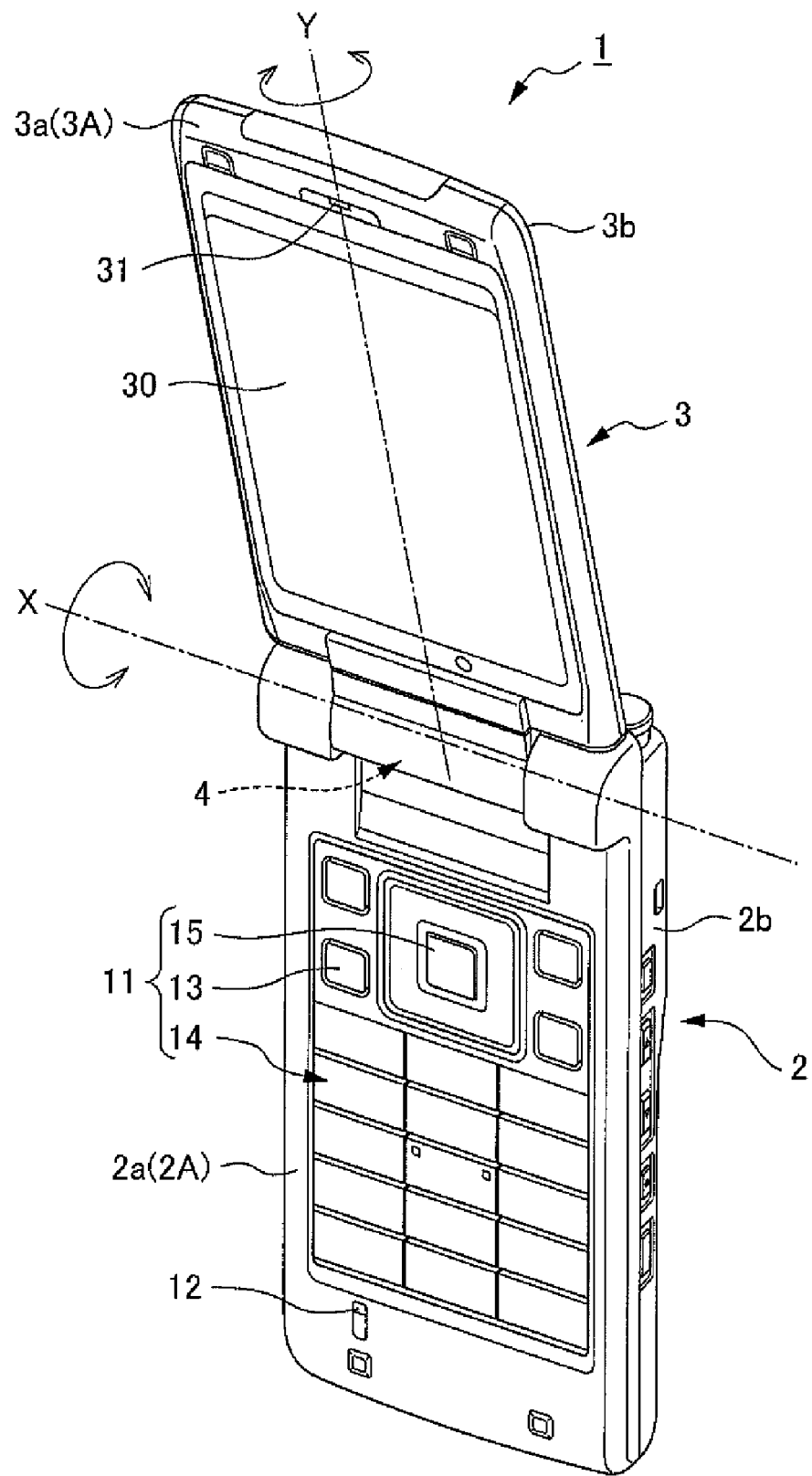
FIG. 1 is a perspective view of a cellular telephone device according to a first embodiment of the present invention in an opened stated.

FIG. 1 is a perspective view of a state in which the cellular telephone device 1 according to the present embodiment is opened. FIG. 2 is a plan view of a state in which an operation unit side body 2 (a first body) and a display unit side body 3 (a second body) of the cellular telephone device 1 according to the present embodiment are closed by rotationally closing around an opening and closing axis X (axis of rotation) of a hinge portion 4 (connecting portion).

Figure 2:
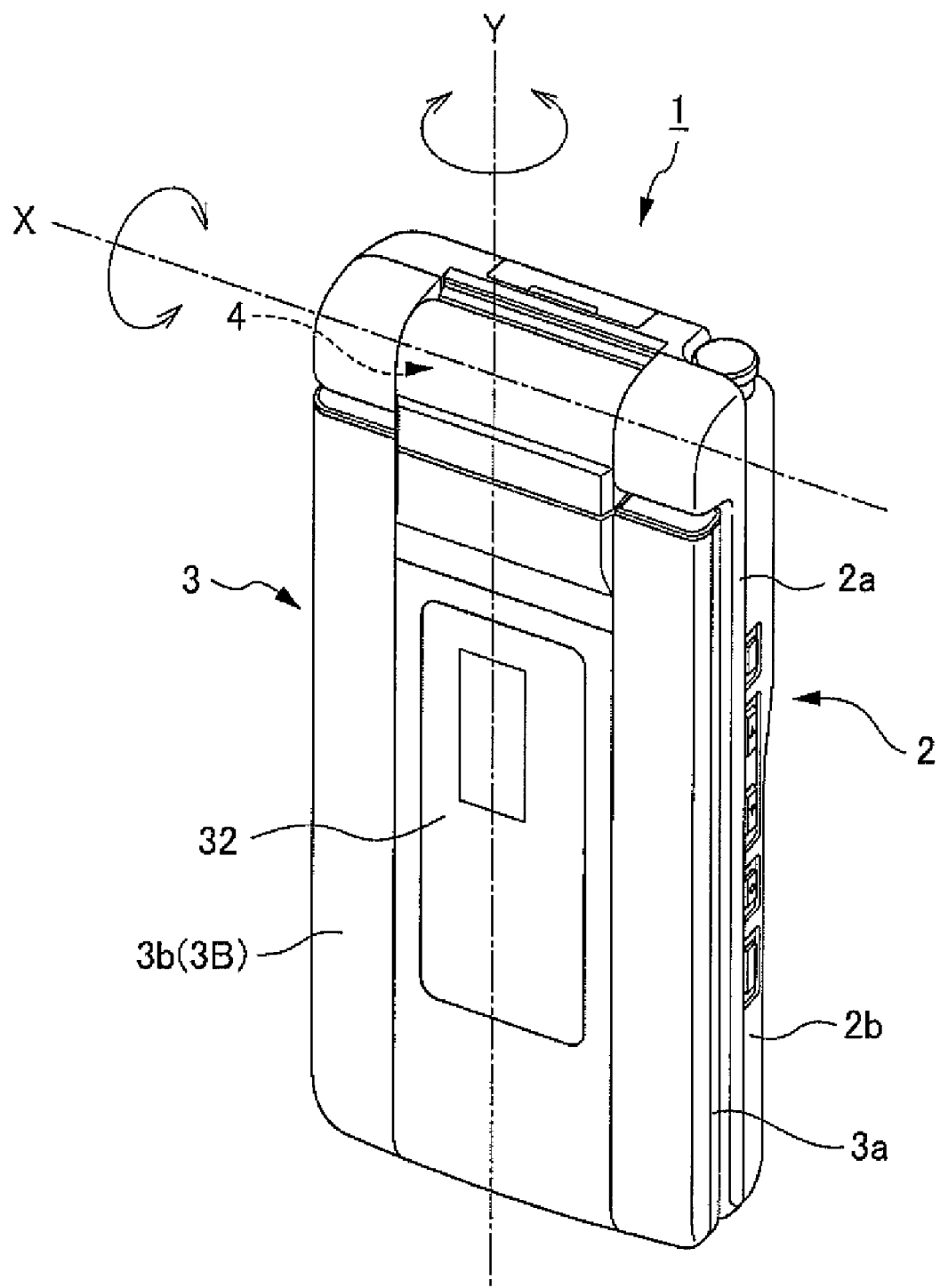
FIG. 2 is a plan view of a closed state by rotationally closing an operation unit side body and a display unit side body around an opening axis of a hinge portion of the cellular telephone device according to the present embodiment.

As shown in FIGS. 1 and 2, the cellular telephone device 1 is equipped with the display unit side body 3, which is the first body, and the operation unit side body 2, which is the second body. The operation unit side body 2 and the display unit side body 3 are connected via a hinge portion 4 that is equipped with a two-shaft hinge mechanism, for example, and are configured so as to be able to relatively move the cellular telephone device 1 to an opened state and a closed state.

In other words, the hinge portion 4 connects the operation unit side body 2 and the display unit side body 3 to be openable to any angle around the opening and closing axis X. In addition, the hinge portion 4 links the operation unit side body 2 and the display unit side body 3 to be rotatable to any angle around the rotating shafts Y.

Here, the closed state (see FIG. 2) is a state in which the operation unit side body 2 and the display unit side body 3 are disposed so as to be mutually superimposed, and the opened state (see FIG. 1) is a state in which the operation unit side body 2 and the display unit side body 3 are disposed so as not to be mutually superimposed.

The operation unit side body 2 has an outer surface mainly composed of a front case 2a and a rear case 2b. The operation unit side body 2 is configured to expose both an operation key set 11 on the front case 2a side and a sound input unit 12 where the sound of the user of the cellular telephone device 1 is input when conversing. Here, the operation key set 11 is composed of: feature setting operation keys 13 for operating various features such as for various settings, a telephone number directory feature and a mail feature; an input operation key 14 such as ten keys for inputting digits of a telephone number and characters for mail, and a selection operation key 15 that performs selection of the various operations and scrolls up, down, left and right.

In addition, the sound input unit 12 is disposed near a leading end (an end opposite to the hinge portion 4) of the front surface 2A side of the operation unit side body 2.

Selected features are assigned to each of the keys (key assignment) composing the operation key set 11 according to the opened or closed state of the operation unit side body 2 and the display unit side body 3 and the type of application that is running. An operation corresponding to a feature assigned to each key is executed by a user pressing one of the keys composing the operation key set 11 of the cellular telephone device 1.

An interface for sending and receiving data with an external device (such as a host device), headphone and microphone terminals, a detachable external memory interface and a terminal for recharging a battery are provided, for example, on a side of the operation unit side body 2.

The display unit side body 3 has an external surface thereof composed mainly of a front case 3a and a rear case 3b. A display 30 of a predetermined shape for displaying a variety of information, and a sound output unit 31 that outputs sound of the other party of the conversation are disposed in the front case 3a. The sound output unit 31 is disposed near a leading end (an end opposite to the hinge portion 4) of the front surface 3A side of the display unit side body 3.

In addition, as shown in FIG. 2, a sub-display 32 for displaying a variety of information is disposed on the rear case 3b of the display unit side body 3 to be exposed. Furthermore, the display 30 and sub-display 32 are composed, for example, of a liquid crystal display panel, a drive circuit that drives the liquid crystal display panel, and a light source unit such as a backlight that irradiates light from the back surface side of the liquid crystal display panel.

<Internal Structural>

Figure 3A:
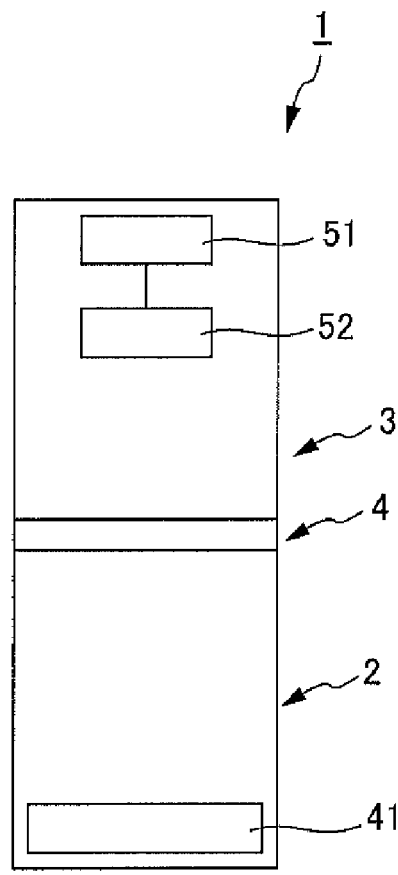
FIGS. 3A and 3B are diagrams simplified to show a transparent appearance of the inside of the cellular telephone device in an opened state and in a closed state.
Figure 3B:
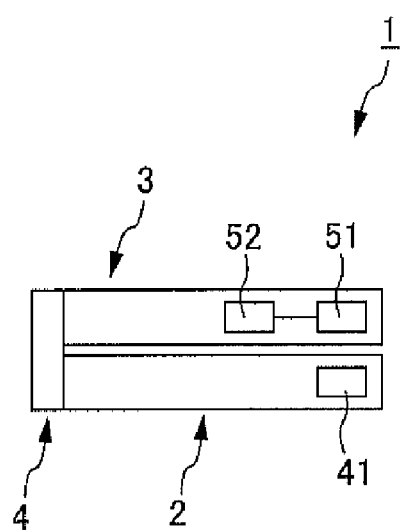

A configuration of the internal structure of the cellular telephone device 1 according to the present invention is explained next using FIGS. 3A and 3B. It should be noted that FIG. 3A is a diagram simplified to show a transparent appearance of the inside of the cellular telephone device 1 when in an opened state, and FIG. 3B is a diagram simplified to show a transparent appearance of the inside of the cellular telephone device 1 when in a closed state. As shown in FIGS. 3A and 3B, the cellular telephone device 1 has an antenna 41 installed in the operation unit side body 2, and an electronic component 51 and an adjusting circuit 52, which is electrically connected to the electronic component 51 and adjusts the resonant frequency of the antenna 41, are installed in the display unit side body 3.

In addition, the hinge portion 4 connects the operation unit side body 2 and the display unit side body 3 so as to freely change between a first state (closed state) in which the antenna and electronic component 51 are capacitively coupled (see FIG. 3A), and a second state (opened state) in which the antenna 41 and electronic component 51 are not capacitively coupled or capacitively coupling to a low degree.

The resonant frequency fc here is given by Equation (1).

$$fc = 1/2\pi\sqrt{(LC)} \quad (1)$$

In the present invention, since capacitance coupling changes from a case in which the state of the cellular telephone device 1 is a closed state to a case in which it is in an opened state based on the relative positions of the antenna 41 and electronic component 51, resonant frequency fc of the antenna 41 is adjusted using the change caused by capacitance coupling. For example, in a case where the cellular telephone device 1 is designed so that, when in an opened state, the resonant frequency fc becomes ideal, then the capacitance coupling changes when the cellular telephone device 1 is in a closed state and the C component of the Equation (1) increases, but counteracts the increased C component because of the L component of the adjusting circuit 52. Thus, when the cellular telephone device 1 is closed, this implements ideal resonant frequency fc.

Figure 4A:
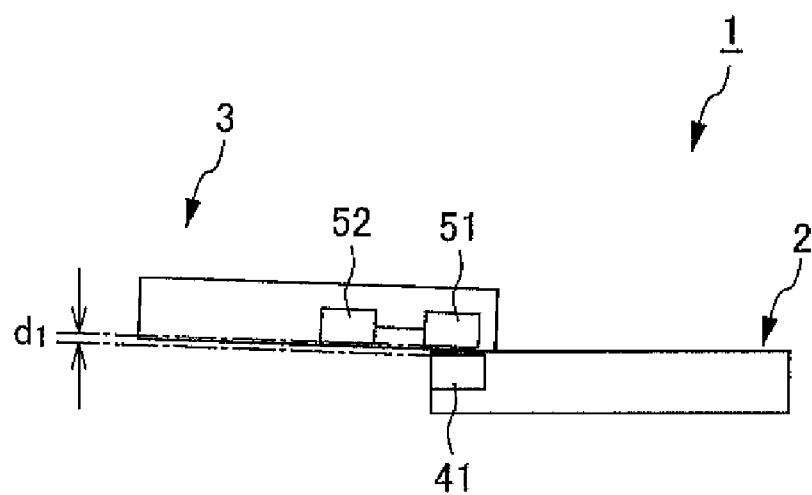
FIGS. 4A and 4B are diagrams simplified to show a transparent appearance of the inside of the cellular telephone device in opened and closed states when an antenna and electronic components are disposed near the hinge unit.
Figure 4B:
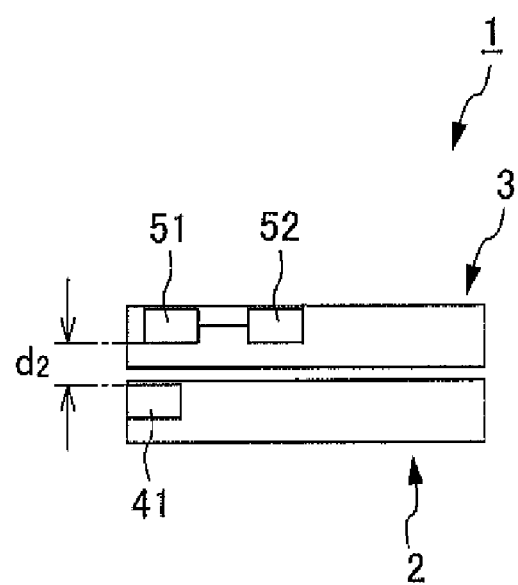

It should be noted that, in this embodiment, although the first state is made the closed state and the second state is made the open state, it is not limited thereto, and making the first state to be the open state and making the second state to be the closed stated is also acceptable. It should be noted that, in such a configuration, as shown in FIG. 4, the antenna 41 is disposed in the end portion of the operation unit side body 2 near the hinge portion 4. Also, the electronic component 51 is disposed in the end portion of the display unit side body 3 near the hinge portion 4. As shown in FIG. 4A, the hinge portion 4 with such a configuration is configured so that, in an opened state, the antenna 41 and electronic component 51 are adjacent and capacitively coupled with a distance d1 therebetween, in addition to being configured so that, as shown in FIG. 4B, the antenna 41 and electronic component 51 are separated with a distance d2 therebetween to have no capacitive coupling or to be capacitively coupled to a low degree in a closed state.

In the prior art, there was no other adjustment of the resonance frequency of the antenna that fluctuated accompanying a change of the states of the first state and the second state than by way of an adjustment circuit connected directly to the antenna. On the other hand, according to the present invention, it is possible to layout the components more efficiently and to stabilize communications because it is possible to adjust the resonance frequency fc of the antenna 41 that fluctuates accompanying changes in the first state and second state by way of the adjusting circuit 52 that is electrically connected directly to the electronic component 51, which is capacitively coupled to the antenna 41.

<Configuration Including a Switch>

The antenna 41 sends and receives using signals of several hundred MHz to several GHz, for example, when used in conversations and data communication. On the other hand, if the electronic component 51 is configured by a sound output unit 31 that outputs sound, for example, it performs processing of signals of several tens of kHz. Therefore, because the frequency bands handled by the antenna and electronic component 51 are differ greatly, even if the adjusting circuit 52 is electrically connected to the electronic component 51, although it is conceivable that there will be no effect when using the electronic component 51, it cannot be said that there is zero possibility of a reduction in conventional functions of the electronic component 51.

Figure 5:
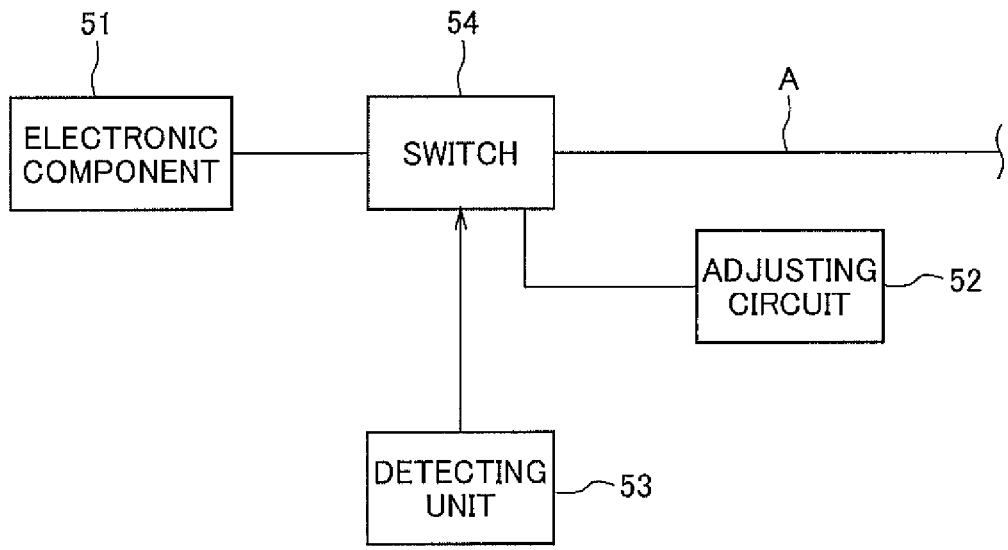
FIG. 5 is a block diagram showing features of the cellular telephone device according to the present invention.

Consequently, as shown in FIG. 5, the cellular telephone device 1 according to the present invention is preferred to adopt a configuration that has a detecting unit 53 (detection means) that detects a first state or a second state; and a switch 54 that electrically connects the adjusting circuit 52 and electronic component 51 when the first state is detected by the detecting unit 53, electrically disconnects with a signal line A that is supplied with sound signals, electrically disconnects the adjusting circuit 52 and electronic component 51 when the second state is detected by the detecting unit 53, and electrically connects to the signal line A that is supplied with sound signals.

With this configuration, when the first state (closed state), which has a high need for adjustment of resonance frequency fc of the antenna 41, is detected, since the adjusting circuit 52 and electronic component 51 are electrically connected, similarly to as described above, it is possible to efficiently layout components as well as to stabilize communication states. In addition, when the second state (open state), which has little need for adjustment of the resonance frequency fc of the antenna 41, is detected, since the switching of the switch 54 electrically disconnects the adjusting circuit 52 and electronic component 51, a decrease of conventional functions of the electronic component 51 is appropriately suppressed.

Furthermore, as described above, the electronic component 51 is disposed at a predetermined location inside the display unit side body 3 facing the antenna 41 in the first state (closed state). With this kind of configuration, due to the present invention strengthening the capacitance coupling between the electronic component 51 and the antenna 41 in the first state (closed state), it is possible to improve the adjustment efficiency of the resonance frequency fc of the antenna 41 by the adjusting circuit 52.

In addition, the antenna 41 includes an element 41a (metallic portion). The element 41a (metallic portion) is formed to correspond to a shape or size of the electronic component 51. According to such a configuration, due to the present invention strengthening the capacitance coupling between the electronic component 51 and the antenna 41 in the first state (closed state), it is possible to improve the adjustment efficiency of the resonance frequency fc of the antenna 41 by the adjusting circuit 52.

Moreover, the electronic component 51 is configured so as to notify predetermined information to outside of the display unit side body 3 by way of a sound-output function (equivalent to the sound output unit 31), a display function (equivalent to the display 30) such as a light emission function or character information and the like, and other information communication functions. It should be noted that the electronic component 51 is not limited to information communication functions, and can have an operation key set 11.

In addition, in the first state, the hinge portion 4 connects the operation unit side body 2 and the display unit side body 3 so that a region where communication of the predetermined information by the information communication function of the electronic component 51 in the display unit side body 3 is covered by the operation unit side body 2.

With this configuration, in the first state (closed state), the convention functions of the electronic component 51 are not effective or in a state not appropriate for use. Therefore, with the present invention, the electronic component 51 and the adjusting circuit 52 are electrically connected when in the first state and, even though the electronic component 51 is in an unusable state, the user has no discomfort.

First Embodiment

Here, the specific configuration for solving the first issue (the resonance frequency fc of the antenna 41 fluctuating according to whether the cellular telephone device 1 is in an open or a closed state, thereby making communication unstable) of the present invention will be explained in detail below. It should be noted that, with the configuration described below, the electronic component 51 is made to be the sound output unit 31, and the sound output unit 31 and adjusting circuit 52 are electrically connected via the switch 54.

Figure 6:
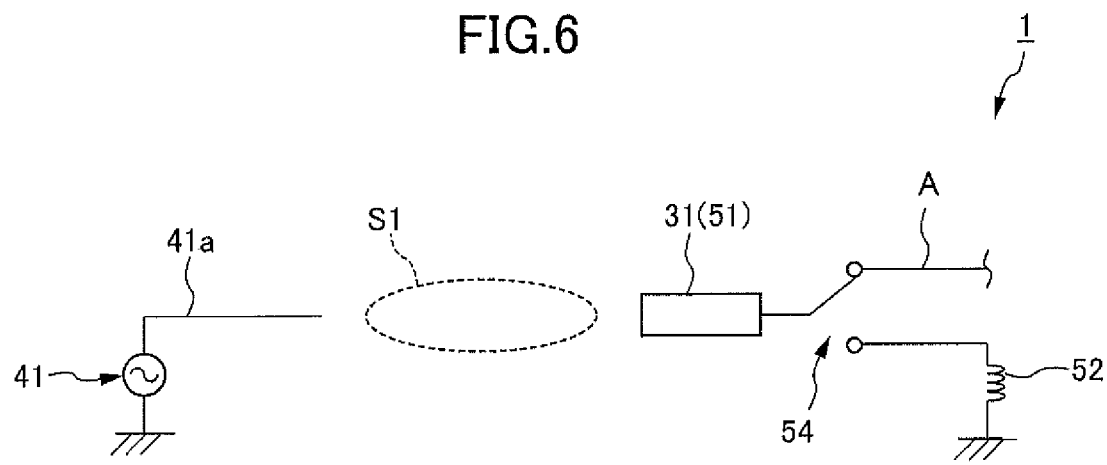
FIG. 6 is a schematic diagram showing a part of a circuit when the cellular telephone device is in an opened state.

FIG. 6 is a block diagram showing an image of an entire circuit when the cellular telephone device 1 is in an opened state. Here, when conversing using the cellular telephone device 1, first the cellular telephone device 1 is opened and, by entering a conversation state using a predetermined operation, sound sent from the other party of a conversation is output from the sound output unit 31.

In addition, as shown in FIG. 6, when the cellular telephone device 1 is in an opened state, the element 41*a* of the antenna 41 and the sound output unit 31 are in a state where they are the most separated (portion S1 encircled by the oval dashed lines in FIG. 6). It should be noted that, when the cellular telephone device 1 is in an opened state, the switch 54 is switched so that the signal line A, which is supplied with sound signals, and the sound output unit 31 are electrically connected. In addition, control of the switching of the switch 54 is performed by a control unit (main CPU), not shown.

Figure 7:
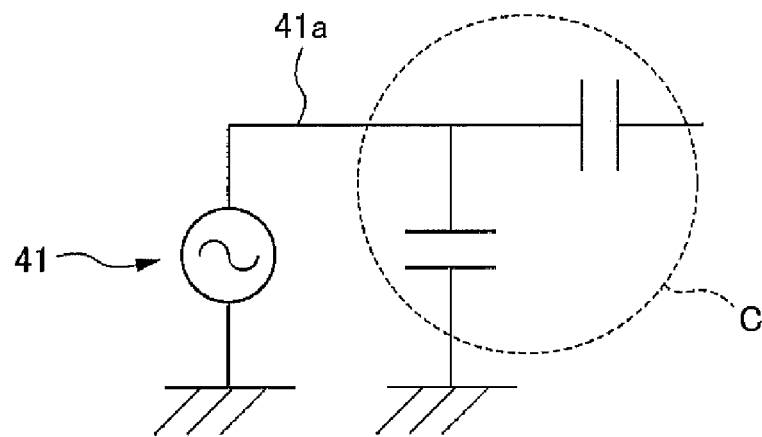
FIG. 7 is a schematic view showing a circuit near the antenna when the cellular telephone device is in a closed state.
Figure 8:
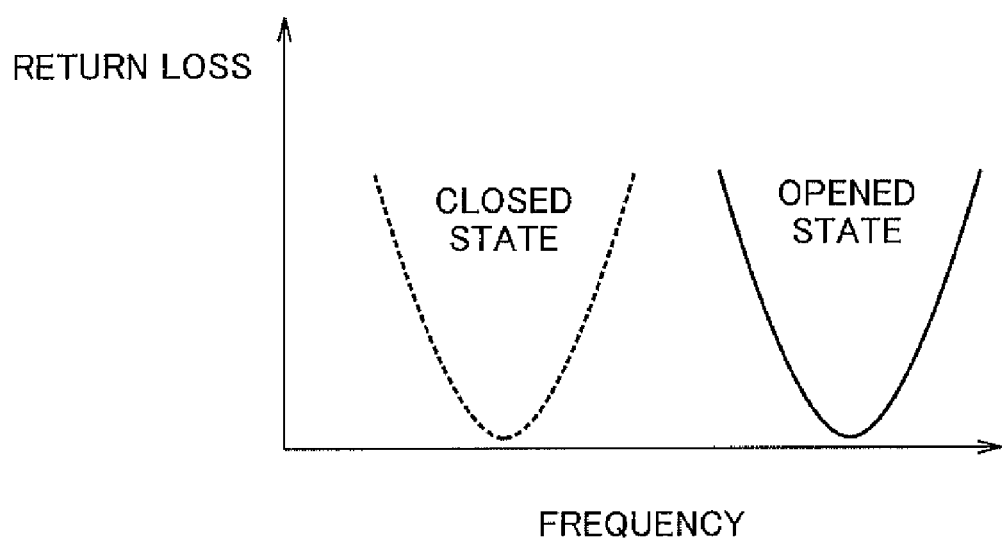
FIG. 8 is a view comparing return loss of the cellular telephone device when in an opened state to when in a closed state.

Furthermore, FIG. 7 is a block diagram showing a circuit image near the antenna 41 when the cellular telephone device 1 is in a closed state. When the cellular telephone device 1 is in a closed state, the sound output unit 31 and the like, which are electronic components, are disposed to be adjacent to the antenna 41. In such a state, a C component (capacitive component) in the element 41*a* of the antenna 41 in the cellular telephone device 1 is added (the portion C enclosed by the dotted line in FIG. 7) and the resonance frequency fc of the antenna 41 fluctuates (decreases) when the cellular telephone device 1 is in the closed state compared to when it is an opened state, as shown in FIG. 8.

With the present invention, due to the phenomenon of the resonant frequency fc fluctuating caused in the opened and closed state of the cellular telephone device 1 being eliminated or reduced, when the sound output unit 31 is adjacent to the antenna 41, the switch 54 switches to actively make a high-frequency connection between the antenna 41 and the sound output unit 31.

Figure 9:
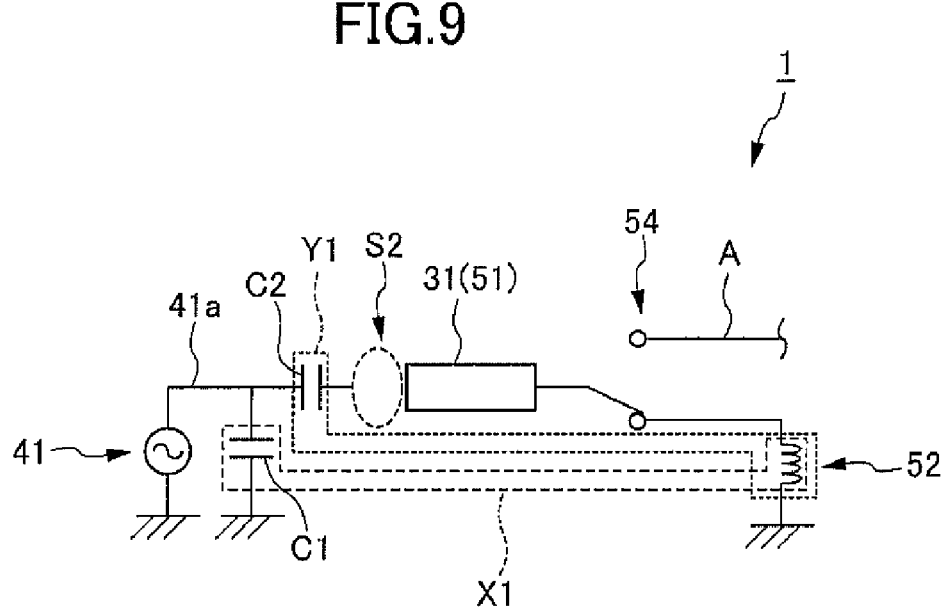
FIG. 9 is a schematic view showing a part of a circuit when the cellular telephone device is in a closed state.

FIG. 9 is a block diagram showing an image of an overall circuit when the cellular telephone device 1 is in a closed state. As shown in FIG. 9, when the cellular telephone device 1 is in a closed state, compared to when in an opened state (see FIG. 6), the element 41*a* of the antenna 41 and the sound output unit 31 are in a state where they are closest (the portion S2 encircled by the dashed lines in FIG. 9). In addition, in the present embodiment, when the cellular telephone device 1 is in a closed state, the sound output unit 31 is assumed not to be used and the switch 54 switches to electrically connect the sound output unit 31 and the adjusting circuit 52 (for example, configured by an inductor).

Figure 10:
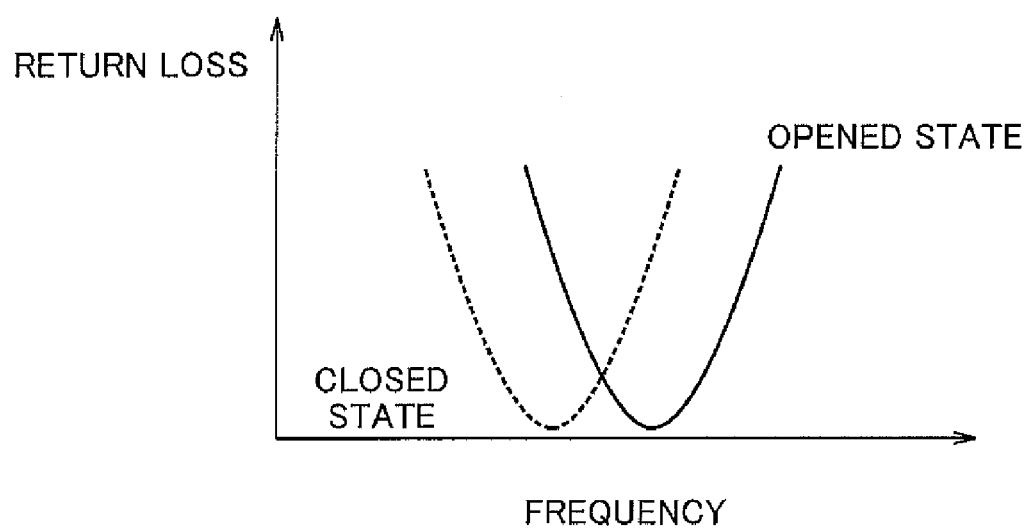
FIG. 10 is a view comparing return loss of the cellular telephone device according to the present invention when in an opened state to when in a closed state.

Therefore, the C component of the first capacitance coupling C1 formed near the antenna 41 is counteracted by the adjusting circuit 52 (the portion X1 encircled by the dotted line in FIG. 9), and the C component of the second capacitance coupling C2 formed near the antenna 41 is counteracted by the adjusting circuit 52 (the portion Y1 encircled by the dotted line in FIG. 9) to eliminate or decrease the change in resonant frequency fc of the antenna 41 (see FIG. 10). Furthermore, with the present invention, since the change in resonance frequency fc of the antenna 41 is eliminated or decreased by using the sound output unit 31, which is not in use in the closed state, the user is unaware that the sound output unit 31 cannot be used. Moreover, it is possible to reduce the space taken up by components without increasing the cost of components.

Second Embodiment

Next, a specific configuration for solving the second issue (the effect on the sound output unit 31 when in the closed state) of the present invention will be explained in detail below. It should be noted that, with the configuration described below, the electronic component 51 is made to be the sound output unit 31, and the sound output unit 31 and adjusting circuit 52 are electrically connected via the switch 54. In addition, it is possible to conceive of cases such as where recorded sound data is heard when using the sound output unit 31 while the cellular telephone device 1 is in the closed state, the display 30 of the display unit side body 3 is in a state where it is exposed externally, and in a closed state.

Figure 11:
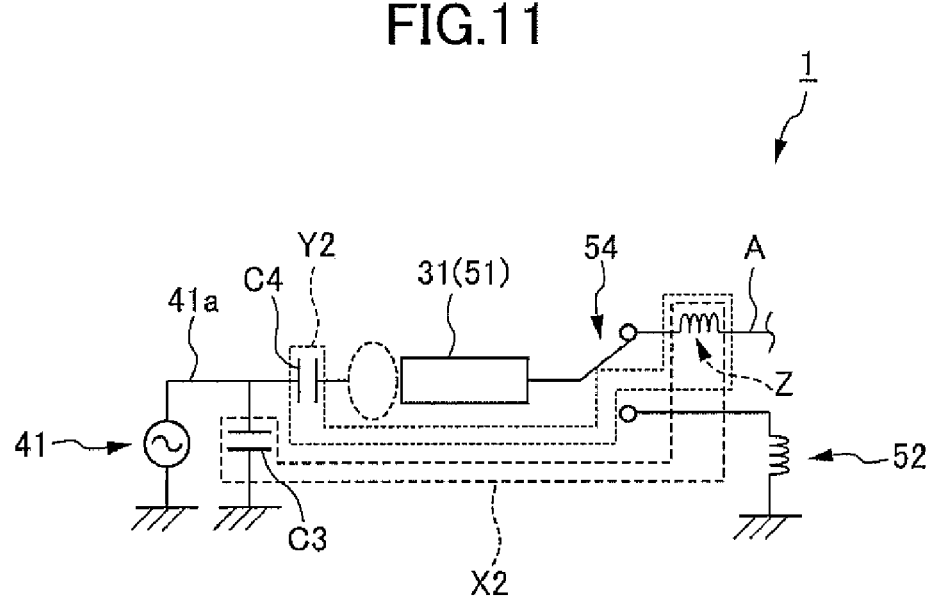
FIG. 11 shows a part of a circuit when a cellular telephone device according to a second embodiment is in a closed state.

FIG. 11 is a block diagram showing an image of an overall circuit when the cellular telephone device 1 is in a closed state. It should be noted that, when the cellular telephone device 1 is in a closed state, the switch 54 is switched to electrically connect the signal line A, which is supplied with sound signals, to the sound output unit 31. In addition, the signal line A is a wire that is wrapped into a coil shape to form the coil Z, for example.

Figure 12:
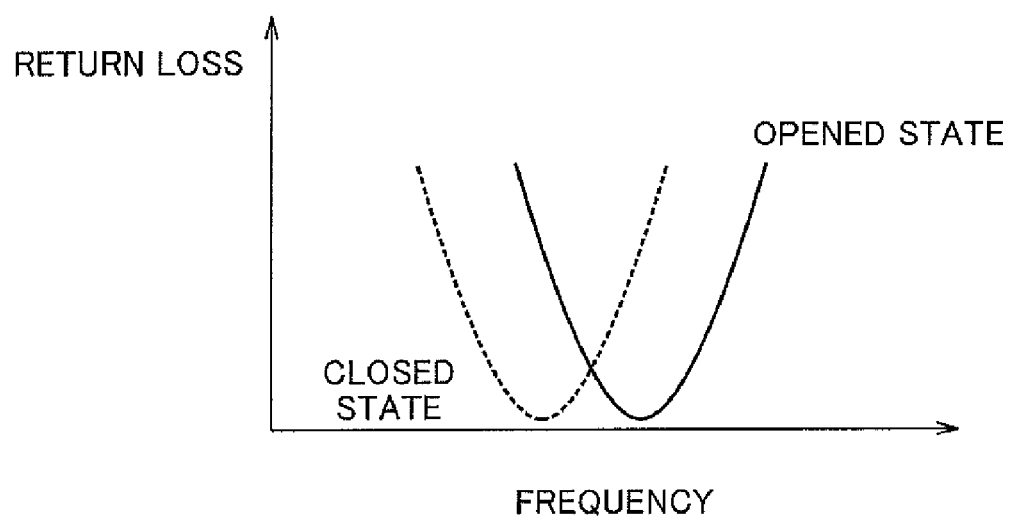
FIG. 12 is a view comparing return loss when the cellular telephone device of the present invention is in an opened state, and when in a closed state.

Therefore, the C component of the first capacitance coupling C3 formed near the antenna 41 is counteracted by the inductor of the coil Z (the portion X2 encircled by the dotted lines in FIG. 11), and the C component of the second capacitance coupling C4 formed near the antenna 41 is counteracted by the inductor of the coil Z (the portion Y2 encircled by the dotted line in FIG. 11) so the cellular telephone device 1 can eliminate or decrease the change in resonant frequency fc of the antenna 41 (see FIG. 12). In addition, since the cellular telephone device 1 eliminates or decreases the change in resonance frequency fc of the antenna 41 by using the sound output unit 31, which is not in use in the closed state, the user is unaware that the sound output unit 31 cannot be used. Furthermore, it is possible to reduce the space taken up by components without increasing the cost of components for the cellular telephone device 1.

It should be noted that, since the sound signal is low frequency (on the order of tens of kHz) compared to the frequency used of the antenna 41, even if an inductor is added to be used in adjusting the frequency of the antenna 41, there is substantially no effect. Therefore, due to the cellular telephone device 1 being able to stop or reduce changes in resonant frequency fc of the antenna 41, even when changed to the opened or closed state, it is possible to stabilize the quality of the communication by way of the antenna 41, and not affect the sound by adding an inductor. Therefore, the cellular telephone device 1 solves the second issue, and even in the closed state of the cellular telephone device 1, proper communication is maintained by way of the antenna 41 while making it possible to appropriately use the sound output unit 31.

<Sound Output Unit 31 and Antenna 41 Configurations>

Figure 13:
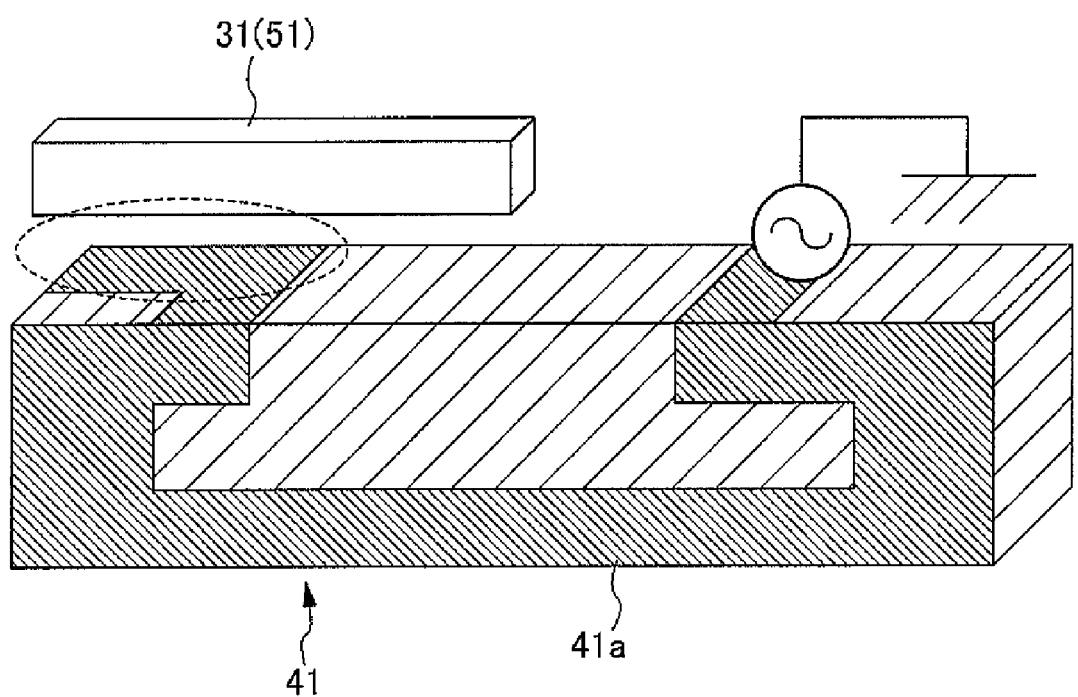
FIG. 13 is a view showing a specific arrangement relationship and configuration of a sound output unit and an antenna.
Figure 14A:
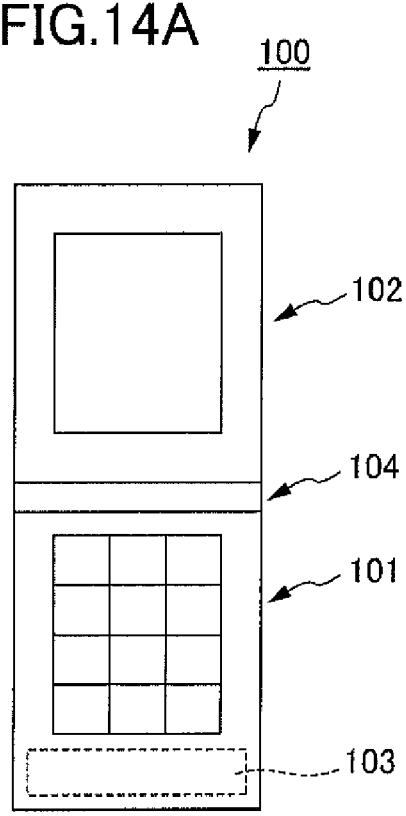
FIGS. 14A and 14B show an external view of the cellular telephone device when in an opened state, and an external view when in a closed state.
Figure 14B:
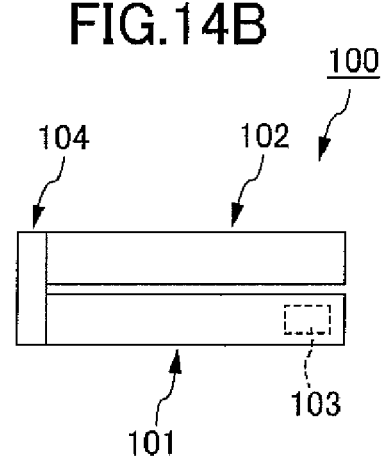
Figure 15:
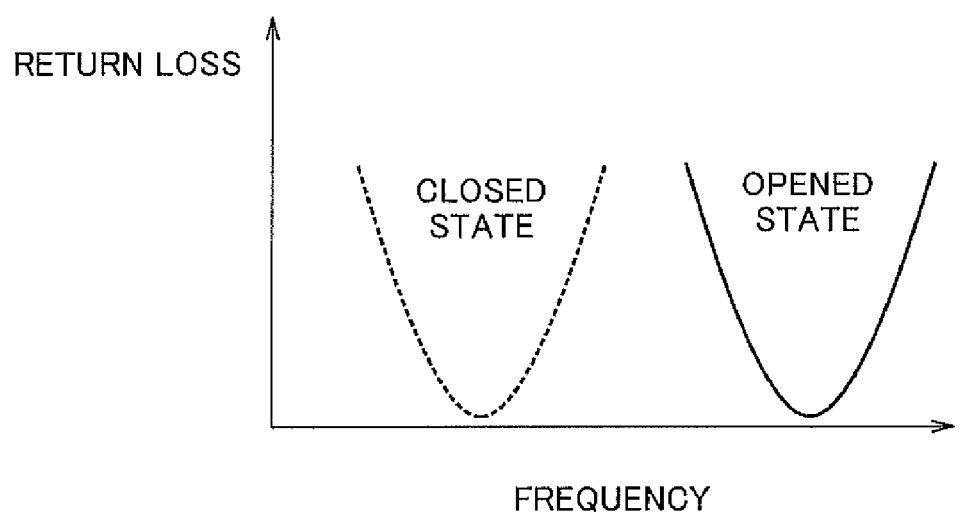
FIG. 15 is a view comparing return loss when the cellular telephone device shown in FIGS. 14A and 14B is in an opened state and when in a closed state, respectively.

Configurations of the sound output unit 31 and antenna 41 will now be explained using FIG. 13. FIG. 13 shows a positional relationship between the antenna 41 and the sound output unit 31 in the closed state of the cellular telephone device 1. In addition, the cellular telephone device 1 has an end of the element 41a of the antenna 41 and the sound output unit 31 disposed to be parallel when in a closed state, and is thereby configured so as to connect at high frequency. It should be noted that the relationship of the sound output unit 31 with the switch 54 and adjusting circuit 52 is the same that described above. In addition, it is also preferred that the sound output unit 31 and the element 41a of the antenna 41 have surface areas mutually facing face each other that are equivalent.

Equation (2) shows a correlation of reactance X, inductance L and frequency f.

$$X = 2\pi f L \qquad (2)$$

As can be ascertained from Equation (2), reactance X increases as the frequency f increases under self-resonant frequency.

Furthermore, the frequency of the sound signal is between several tens of Hz to several tens of kHz, and the frequency used in conversations and data communications is several hundred MHz to several GHz. Therefore, even if an inductor for adjustment of the resonant frequency is inserted on the signal line A through which a sound signal is transmitted, there is substantially no effect on the sound signal.

What is claimed is:

1. A portable electronic device comprising:
    a first body;
    an antenna that is disposed in the first body;
    a second body;
    an electronic component that is disposed in the second body;
    a connecting portion that connects the first body and the second body to movable relatively; and
    an adjusting circuit that is electrically connected to the electronic component and adjusts a resonance frequency of the antenna according to relative movement of the first body and the second body by way of the connecting portion, wherein
    the connecting portion connects to enable relative movement between a first state in which the antenna and the electronic component are capacitively coupled, and a second state in which the antenna and the electronic component are not capacitively coupled or capacitively coupled to a small degree, and
    the adjusting circuit adjusts a resonance frequency of the antenna according to the first state and the second state.

2. The portable electronic device according to claim 1, further comprising:
    a detection means for detecting the first state or the second state; and
    a switch that electrically connects the adjusting circuit and the electronic component when the first state is detected by the detecting means, and electrically disconnects the adjusting circuit and the electronic component when the second state is detected by the detecting means.

3. The portable electronic device according to claim 1, wherein the electronic component is disposed at a predetermined location in the first body so as to face the antenna in the first state.

4. The portable electronic device according to claim 3, wherein the antenna comprises a metallic portion, and
    the metallic portion is formed to correspond to a shape or a size of the electronic component.

5. The portable electronic device according to claim 1, wherein:
    the electronic component is configured so as to communicate predetermined information to outside of the second body by way of a sound output feature, a light emission feature, a display feature such as of character information, or other information communication feature, and
    in the first state, the connecting portion connects the first body and second body to be movable relatively so that the region where communication of predetermined information by the information communication feature of the electronic component in the second body is covered by the first body.

6. The portable electronic device according to claim 1, wherein the connecting portion is a hinge.

7. The portable electronic device according to claim 6, wherein the hinge is a two-shaft hinge.

8. The portable electronic device according to claim 1, wherein the portable electronic devices is selected from the group consisting of a portable game machine, portable navigation device, a personal digital assistant, and portable telephone device.

9. A portable electronic device comprising:
    a first body;
    an antenna that is disposed in the first body;
    a second body;
    an electronic component that is disposed in the second body;
    a connecting portion that connects the first body and the second body to movable relatively; and
    an adjusting circuit that is electrically connected to the electronic component and adjusts a resonance frequency of the antenna according to relative movement of the first body and the second body by way of the connecting portion, wherein
    the connecting portion connects to enable relative movement between a first state in which the antenna and the electronic component are capacitively coupled, and a second state in which the antenna and the electronic component are not capacitively coupled or capacitively coupled to a small degree,
    the adjusting circuit adjusts a resonance frequency of the antenna according to the first state and the second state, and
    the first state is a closed state and the second state is an open state.

10. The portable electronic device according to claim 9, further comprising:
    a detection means for detecting the first state or the second state; and
    a switch that electrically connects the adjusting circuit and the electronic component when the first state is detected by the detecting means, and electrically disconnects the adjusting circuit and the electronic component when the second state is detected by the detecting means.

11. The portable electronic device according to claim 9, wherein the electronic component is disposed at a predetermined location in the first body so as to face the antenna in the first state.

12. The portable electronic device according to claim 11, wherein the antenna comprises a metallic portion that is formed to correspond to a shape or a size of the electronic component.

13. The portable electronic device according to claim 9, wherein the electronic component is configured so as to communicate predetermined information to outside of the second body by way of a sound output feature, a light emission feature, a display feature such as of character information, or other information communication feature.

14. The portable electronic device according to claim 9, wherein the connecting portion is a hinge.

15. The portable electronic device according to claim 14, wherein the hinge is a two-shaft hinge.

16. The portable electronic device according to claim 9, wherein the portable electronic devices is selected from the group consisting of a portable game machine, portable navigation device, a personal digital assistant, and portable telephone device.

17. A portable electronic device comprising:
a first body;
an antenna that is disposed in the first body;
a second body;
an electronic component that is disposed in the second body;
a connecting portion that connects the first body and the second body to movable relatively; and
an adjusting circuit that is electrically connected to the electronic component and adjusts a resonance frequency of the antenna according to relative movement of the first body and the second body by way of the connecting portion, wherein
the connecting portion connects to enable relative movement between a first state in which the antenna and the electronic component are capacitively coupled, and a second state in which the antenna and the electronic component are not capacitively coupled or capacitively coupled to a small degree,
the adjusting circuit adjusts a resonance frequency of the antenna according to the first state and the second state, and
the first state is an open state and the second state is a closed state.

18. The portable electronic device according to claim 17, wherein the antenna comprises a metallic portion that is formed to correspond to a shape or a size of the electronic component.

19. The portable electronic device according to claim 17, wherein
the antenna is disposed in an end of the first body, and
the electronic component is disposed in an end of the second body.

20. The portable electronic device according to claim 17, wherein the antenna and the electronic component are disposed near the connecting portion.

* * * * *